(12) United States Patent
Huang

(10) Patent No.: US 8,994,895 B2
(45) Date of Patent: Mar. 31, 2015

(54) BACKLIGHT MODULE AND LIQUID CRYSTAL DISPLAY APPARATUS

(75) Inventor: Jianfa Huang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 13/502,745

(22) PCT Filed: Mar. 28, 2012

(86) PCT No.: PCT/CN2012/073179
§ 371 (c)(1),
(2), (4) Date: Apr. 19, 2012

(87) PCT Pub. No.: WO2013/139050
PCT Pub. Date: Sep. 26, 2013

(65) Prior Publication Data
US 2015/0002786 A1    Jan. 1, 2015

(30) Foreign Application Priority Data

Mar. 19, 2012 (CN) .......................... 2012 1 0072194

(51) Int. Cl.
G02F 1/1335     (2006.01)
F21V 8/00       (2006.01)
G02B 5/126      (2006.01)

(52) U.S. Cl.
CPC .............. G02B 6/0031 (2013.01); G02B 5/126 (2013.01); G02F 1/133553 (2013.01); G02F 1/1336 (2013.01)
USPC .............................................. 349/65; 349/62

(58) Field of Classification Search
USPC ...................................................... 349/65, 62
See application file for complete search history.

(56) References Cited

U.S. PATENT DOCUMENTS

| | | | | |
|---|---|---|---|---|
| 5,166,815 A * | 11/1992 | Elderfield | ...................... | 349/64 |
| 5,808,708 A * | 9/1998 | Oyama et al. | .................... | 349/65 |
| 7,460,196 B2 * | 12/2008 | Kim et al. | ........................ | 349/64 |
| 7,932,966 B2 * | 4/2011 | Kim et al. | ........................ | 349/64 |
| 8,085,359 B2 * | 12/2011 | Olson et al. | ..................... | 349/65 |
| 8,259,281 B2 * | 9/2012 | Takahashi | ..................... | 349/161 |
| 8,698,972 B2 * | 4/2014 | Kim et al. | ........................ | 349/58 |

\* cited by examiner

*Primary Examiner* — James Dudek
(74) *Attorney, Agent, or Firm* — Mark M. Friedman

(57) ABSTRACT

The present invention provides a backlight module and a liquid crystal display apparatus. The backlight module comprises a light guide plate; a base disposed at one side of the light guide plate; a light source disposed on the base; and a reflective element configured to reflect light rays which are emitted from the light source to a light-incident surface of the light guide plate, wherein the reflective element includes a reflective curved surface and a first reflective plane connected thereto. The backlight module and the liquid crystal display apparatus of the present invention can have a high coupling efficiency.

17 Claims, 3 Drawing Sheets

BACKLIGHT MODULE AND LIQUID CRYSTAL DISPLAY APPARATUS

FIELD OF THE INVENTION

The present invention relates to field of a liquid crystal display (LCD) technology, and more particularly to a backlight module and a liquid crystal display apparatus capable of improving a coupling efficiency thereof.

BACKGROUND OF THE INVENTION

Liquid crystal displays (LCDs) have been widely applied in electrical products. Currently, most of LCDs are backlight type LCDs, and comprise a liquid crystal panel and a backlight module. According to the position of the light sources, the backlight module can be classified into a side-light type or a direct-light type.

Referring to FIG. 1, FIG. 1 is a structural diagram showing a conventional side-light type backlight module. The backlight module comprises a light guide plate 101, a light source 102, a reflective device 103, a base 104, a reflective sheet 105, a back bezel 106 and light source reflective films 107. In general, the reflective device 103 is an oblique reflective face. By using an optical simulation software to simulate, it is found that a portion of the light rays which are reflected by the reflective device 103 can not enter the light guide plate 101, and are reflected back to the light source 102, resulting in a greater loss (greater than 15%) to a coupling efficiency of the backlight module.

As a result, it is necessary to provide a backlight module and a liquid crystal display apparatus to solve the problems existing in the conventional technologies, as described above.

SUMMARY OF THE INVENTION

The present invention provides a backlight module and a liquid crystal display apparatus with a reflective element comprising a reflective curved surface and a reflective plane. The reflective element can improve a coupling efficiency of the backlight module, thereby solving the problem of low coupling efficiency existing in the conventional backlight module and the liquid crystal display apparatus.

The present invention provides a backlight module. The backlight module comprises a light guide plate; a base disposed at one side of the light guide plate; a light source disposed on the base; and a reflective element configured to reflect light rays which are emitted from the light source to a light-incident surface of the light guide plate, wherein the reflective element includes a reflective curved surface and a first reflective plane connected thereto, and the first reflective plane is parallel to the light-incident surface of the light guide plate, and the reflective curved surface has a profile curve of a gradually reducing slope, and the reflective curved surface has a first curvature radius and a second curvature radius, and the first curvature radius is close to the light guide plate, and the second curvature radius is far away the light guide plate, and the second curvature radius is greater than the first curvature radius.

The present invention further provides a backlight module. The backlight module comprises a light guide plate; a base disposed at one side of the light guide plate; a light source disposed on the base; and a reflective element configured to reflect light rays which are emitted from the light source to a light-incident surface of the light guide plate, wherein the reflective element includes a reflective curved surface and a first reflective plane connected thereto.

In the backlight module of the present invention, the first reflective plane is parallel to the light-incident surface of the light guide plate, and the reflective curved surface has a profile curve of a gradually reducing slope.

In the backlight module of the present invention, the reflective element comprises the first reflective plane, a reflective curved surface and a second reflective plane connected in sequence.

In the backlight module of the present invention, the reflective curved surface has a first curvature radius and a second curvature radius, and the first curvature radius is close to the light guide plate, and the second curvature radius is far away the light guide plate, and the second curvature radius is greater than the first curvature radius.

In the backlight module of the present invention, an angle between the first reflective plane and the second reflective plane is greater than 90 degrees.

In the backlight module of the present invention, a change rate of the profile curve is less than 0.7.

In the backlight module of the present invention, a maximum slope of the profile curve is in the range of 2 to 2.5, and a minimum slope of the profile curve is in the range of 0.25 to 0.3.

In the backlight module of the present invention, a ratio of a height of the first reflective plane and a height of the reflective curved surface is in the range of 0.9 to 1.1.

In the backlight module of the present invention, a ratio of a height of the first reflective plane and a height of the reflective curved surface is in the range of 0.9 to 1.1, and another ratio of the height of the reflective curved surface and a height of the second reflective plane is in the range of 9 to 11.

The present invention further provides a liquid crystal display apparatus comprising a display panel and a backlight module. The backlight module comprises a light guide plate; a base disposed at one side of the light guide plate; a light source disposed on the base; and a reflective element configured to reflect light rays which are emitted from the light source to a light-incident surface of the light guide plate, wherein the reflective element includes a reflective curved surface and a first reflective plane connected thereto.

In the liquid crystal display apparatus of the present invention, the first reflective plane is parallel to the light-incident surface of the light guide plate, and the reflective curved surface has a profile curve of a gradually reducing slope.

In the liquid crystal display apparatus of the present invention, the reflective element comprises the first reflective plane, a reflective curved surface and a second reflective plane connected in sequence.

In the liquid crystal display apparatus of the present invention, the reflective curved surface has a first curvature radius and a second curvature radius, and the first curvature radius is close to the light guide plate, and the second curvature radius is far away the light guide plate, and the second curvature radius is greater than the first curvature radius.

In the liquid crystal display apparatus of the present invention, an angle between the first reflective plane and the second reflective plane is greater than 90 degrees.

In the liquid crystal display apparatus of the present invention, a change rate of the profile curve is less than 0.7.

In the liquid crystal display apparatus of the present invention, a maximum slope of the profile curve is in the range of 2 to 2.5, and a minimum slope of the profile curve is in the range of 0.25 to 0.3.

In the liquid crystal display apparatus of the present invention, a ratio of a height of the first reflective plane and a height of the reflective curved surface is in the range of 0.9 to 1.1.

In the liquid crystal display apparatus of the present invention, a ratio of a height of the first reflective plane and a height of the reflective curved surface is in the range of 0.9 to 1.1, and another ratio of the height of the reflective curved surface and a height of the second reflective plane is in the range of 9 to 11.

With the use of the backlight module and the liquid crystal display apparatus of the present invention, the reflective element having the reflective curved surface and the first reflective plane is arranged for raising the coupling efficiency of the backlight module, as well as solving the problem of low coupling efficiency existing in the conventional backlight module and the liquid crystal display apparatus.

The structure and the technical means adopted by the present invention to achieve the above and other objects can be best understood by referring to the following detailed description of the preferred embodiments and the accompanying drawings:

DETAILED DESCRIPTION OF THE PREFERRED EMBODIMENTS

Figure 1:
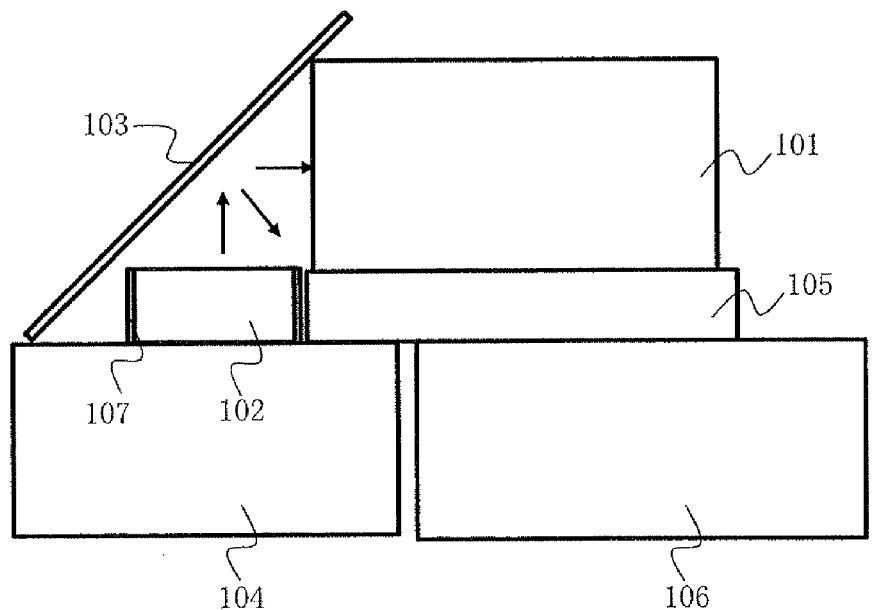
FIG. 1 is a structural diagram showing a conventional side-light type backlight module.

The following embodiments are exemplified by referring to the accompanying drawings, for describing specific embodiments implemented by the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, like reference numerals indicate like components or items.

Figure 2:
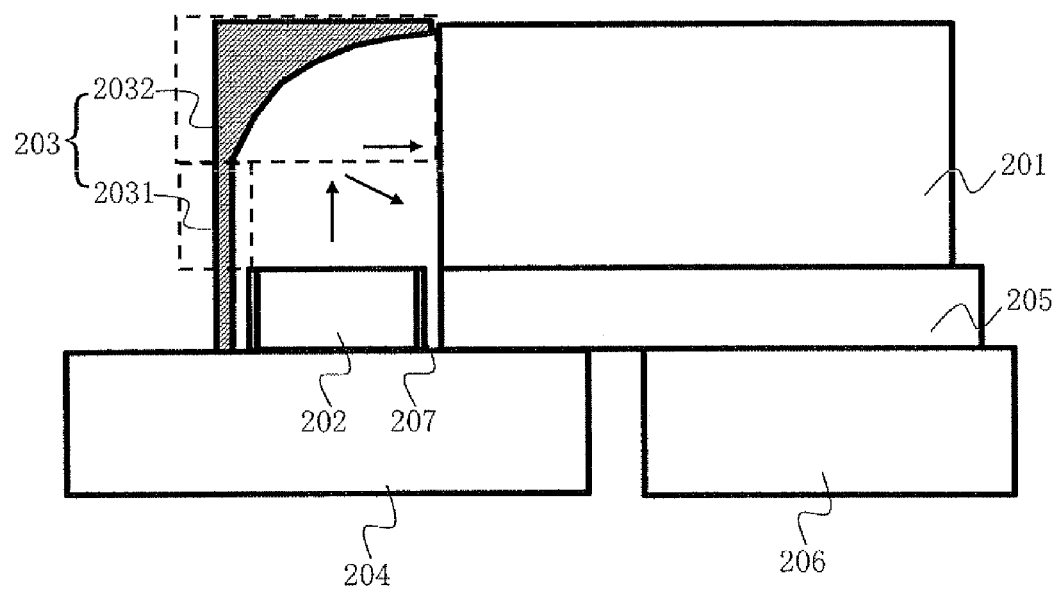
FIG. 2 is a structural diagram showing a backlight module according to a first preferred embodiment of the present invention.

Referring to FIG. 2, FIG. 2 is a structural diagram showing a backlight module according to a first preferred embodiment of the present invention. The backlight module comprises a light guide plate 201, a light source 202, a reflective element 203, a base 204, a reflective sheet 205, a back bezel 206 and light source reflective films 207. The light guide plate 201 is disposed on the back bezel 206 for guiding light rays of the light source. The base 204 is disposed at one side of the light guide plate 201, and the light source 202 is disposed on the base 204 for emitting the light rays to the light guide plate 201, wherein a light-emitting surface is substantially vertical to a light-incident surface of the light guide plate. The reflective element 203 is disposed at the light-incident side of the light guide plate 201 for reflecting the light rays which are emitted from the light source 202 to the light-incident surface of the light guide plate 201. The reflective sheet 205 is configured to reflect the light rays which are incident on a light-reflecting surface of the light guide plate 201, and the light source reflective films 207 are configured to reflect the light rays which are incident on sidewalls of the light source. In this embodiment, the reflective element 203 includes a reflective curved surface and a first reflective plane connected thereto (above the light source 202 as shown in FIG. 2).

Figure 3:
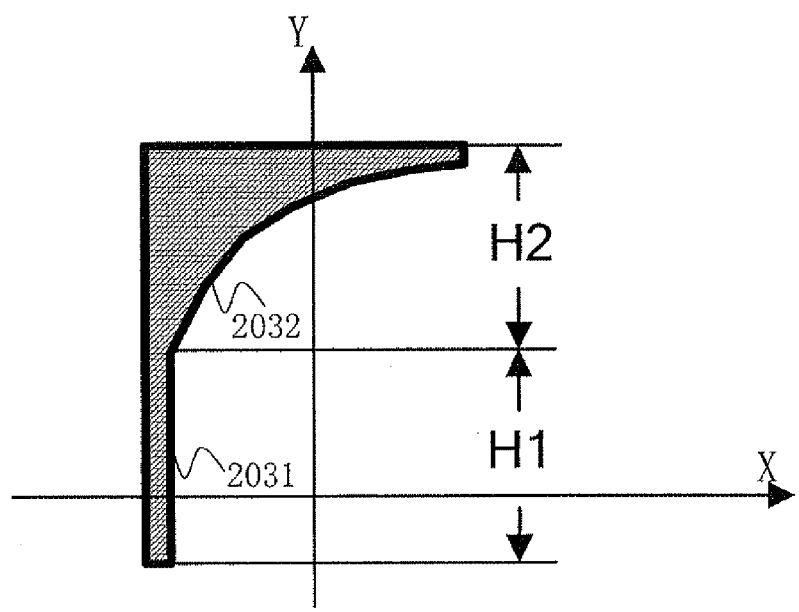
FIG. 3 is a structural diagram showing the reflective element according to the first preferred embodiment of the present invention.

The specific structure of the reflective element 203 is shown in FIG. 3, and FIG. 3 is a structural diagram showing the reflective element according to the first preferred embodiment of the present invention. Referring to FIG. 2 and FIG. 3 again, the reflective element 203 comprises the first reflective plane 2031 and the reflective curved surface 2032. The first reflective plane 2031 is parallel to the light-incident surface of the light guide plate 201. According to a coordinate system as shown in FIG. 3, the reflective curved surface 2032 has a profile curve (curved line) of a gradually reducing slope. A surface (i.e. the reflective curved surface) having the profile curve is formed between the light-emitting surface of the light source 202 and the light-incident surface of the light guide plate 201. The first reflective plane 2031 is smoothly connected to the reflective curved surface 2032 above the light source 202, wherein the first reflective plane 2031 is connected to one side of the reflective curved surface 2032, and the profile curve has a maximum slope at the side thereof. In this case, an initial slope (the maximum slope) of the profile curve is in the range of 2 to 2.5, and an end slope (the minimum slope) of the profile curve is in the range of 0.25 to 0.3, a change rate of the profile curve is less than 0.7. At the same time, referring to FIG. 3, a ratio (H1/H2) of a height H1 of the first reflective plane 2031 and a height H2 of the reflective curved surface 2032 is in the range of 0.9 to 1.1.

Figure 4:
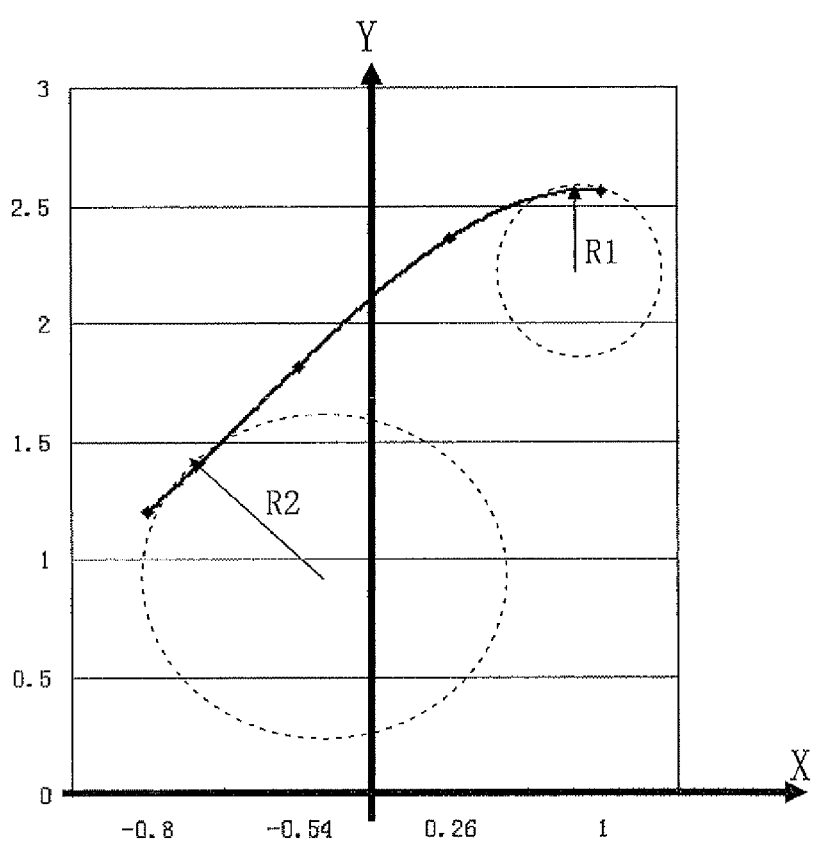
FIG. 4 is a schematic diagram showing the profile curve according to the first preferred embodiment of the present invention.

Referring to FIG. 4, FIG. 4 is a schematic diagram showing the profile curve according to the first preferred embodiment of the present invention. In this embodiment, the reflective curved surface 2032 may be a parabolic surface having a first curvature radius R1 and a second curvature radius R2. The first curvature radius R1 is close to the light-incident surface of the light guide plate 201, and the second curvature radius R2 is far away the light-incident surface of the light guide plate 201, wherein the second curvature radius R2 is greater than the first curvature radius R1. Referring to FIG. 4, in this embodiment, the profile curve of the reflective curved surface 2032 can be expressed as (according to a coordinate system as shown in FIG. 3):

$$y = -0.5185x^2 + 0.7964x + 2.2601 \quad (1)$$

When utilizing the backlight module of the present embodiment, referring to FIG. 2 and FIG. 3 again, the reflective element 203 comprises the first reflective plane 2031 and the reflective curved surface 2032, such that most of the light rays of the light source 202 can be reflected to the light-incident surface of the light guide plate 201 by the reflective element 203. With the use of the initial slope, the end slope and the change rate of the profile curve of the reflective curved surface 2032, a reflective effect of the reflective curved surface 2032 can be improved. With the use of the height ratio (H1/H2) of the first reflective plane 2031 and the reflective curved surface 2032, the arrangement of the first reflective plane 2031 and the reflective curved surface 2032 can be improved, thereby preventing the reflective effect of the reflective curved surface 2032 from being affected by the height of the first reflective plane 2031. At the same time, the profile curve of the reflective curved surface 2032 may be a polynomial curve, such as a quadratic curve, so as to achieve the backlight module of the present invention, but not limited to the above description.

Figure 5:
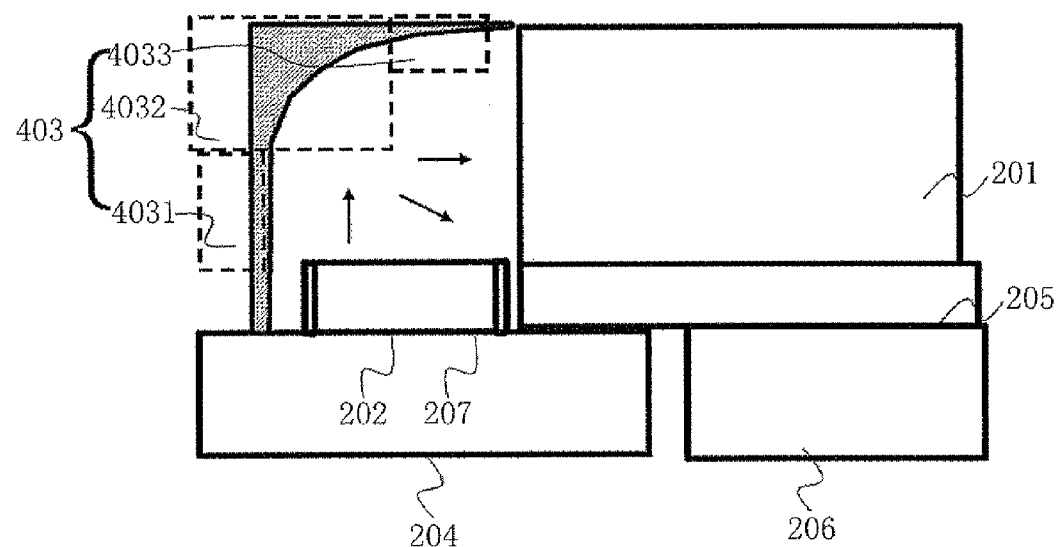
FIG. 5 is a structural diagram showing a backlight module according to a second preferred embodiment of the present invention.

Referring to FIG. 5, FIG. 5 is a structural diagram showing a backlight module according to a second preferred embodiment of the present invention. The second embodiment differs from the first embodiment in the reflective element 403 of the backlight module. The reflective element 403 comprises a first reflective plane 4031 (referring to a portion above the light source 202 shown in FIG. 5), a reflective curved surface 4032 and a second reflective plane 4033 connected in sequence, wherein the second reflective plane 4033 extends along a tangent line of the reflective curved surface 4032.

Figure 6:
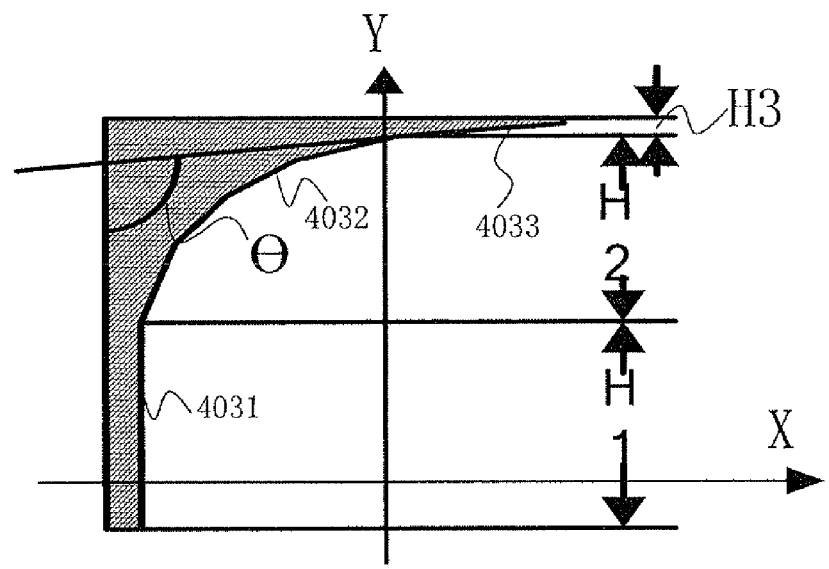
FIG. 6 is a structural diagram showing the reflective element according to the second preferred embodiment of the present invention.

The specific structure of the reflective element 403 is shown in FIG. 6, and FIG. 6 is a structural diagram showing the reflective element according to the second preferred embodiment of the present invention. Referring to FIG. 5 and FIG. 6 again, the first reflective plane 4031 is parallel to the light-incident surface of the light guide plate 201. According to a coordinate system as shown in FIG. 6, the reflective curved surface 4032 includes a profile curve (curved line) which has a gradually reducing slope. The first reflective plane 4031, the reflective curved surface 4032 and the second reflective plane 4033 are smoothly connected to each other and positioned above the light source 202. That is, the first reflective plane 4031 is connected to one side of the reflective curved surface 4032 with the profile curve of the maximum slope, and the second reflective plane 4033 is connected to another side of the reflective curved surface 4032 with the profile curve of the minimum slope. In this case, an initial slope (the maximum slope) of the profile curve is in the range of 2 to 2.5, and an end slope (the minimum slope) of the profile curve is in the range of 0.25 to 0.3, a change rate of the profile curve is less than 0.7. At the same time, referring to FIG. 6, a ratio (H1/H2) of a height H1 of the first reflective plane 4031 and a height H2 of the reflective curved surface 4032 is in the range of 0.9 to 1.1, and another ratio (H2/H3) of the height H2 of the reflective curved surface 4032 and a height H3 of the second reflective plane 4033 is in the range of 9 to 11.

When utilizing the backlight module of the present embodiment, referring to FIG. 5 and FIG. 6 again, based on the first embodiment, the reflective element 403 can be applicable to the light source 202 of an increased size and the light guide plate 201 of a reduced thickness. In this case, the height of the reflective element 403 is slightly increased, and most of the light rays of the light source 202 can be reflected to the light-incident surface of the light guide plate 201 by the reflective element 403. In this embodiment, with the use of the initial slope, the end slope and the change rate of the profile curve of the reflective curved surface 4032, a reflective effect of the reflective curved surface 4032 can be improved. With the use of the height ratio (H1/H2) of the first reflective plane 4031 and the reflective curved surface 4032, and the height ratio (H2/H3) of the reflective curved surface 4032 and the second reflective plane 4033, the arrangement of the first reflective plane 4031, the reflective curved surface 4032 and the second reflective plane 4033, thereby preventing the reflective effect of the reflective curved surface 4032 from being affected by the height of the first reflective plane 4031, as well as enhancing a reflective effect of the reflective element 403. At the same time, the profile curve of the reflective curved surface 4032 may be a polynomial curve, such as a quadratic curve, so as to achieve the backlight module of the present invention, but not limited to the above description.

In this embodiment, the second reflective plane 4033 extends from the end of the reflective curved surface 4032, and thus a slope of the second reflective plane 4033 may be less than or equal to the minimum slope of the profile curve. An angle ⊖ between the first reflective plane 4031 and the second reflective plane 4033 may be greater than 90 degrees (⊖>90°), thereby improving the reflective effect of the reflective curved surface 4032, as well as smoothly connecting the reflective curved surface 4032 and the second reflective plane 4033. Therefore, some of the light rays of the light source 202 can be reflected to the light-incident surface of the light guide plate 201 by the second reflective plane 4033.

By using an optical simulation software to simulate the backlight module of the present invention, it is found that most of the light rays of the light source 202 can be reflected to the light guide plate 201 by the reflective element 403, resulting in a high coupling efficiency of 90.5%, thereby improving the coupling efficiency in comparison with the conventional backlight module.

The present invention further provides a liquid crystal display (LCD) apparatus. The LCD apparatus comprises a display panel and the backlight module provided. The backlight module comprises the light guide plate, the base, the light source and the reflective element. The light guide plate is disposed on the back bezel for guiding light rays of the light source. The base is disposed at one side of the light guide plate, and the light source is disposed on the base for emitting the light rays to the light guide plate. The reflective element is disposed at the light-incident side of the light guide plate for reflecting the light rays which are emitted from the light source to the light-incident surface of the light guide plate. The reflective element includes a reflective curved surface and a first reflective plane connected thereto. The principle and beneficial effect of the liquid crystal display apparatus are the same or similar to the description in the above-mention embodiments of the backlight module. Please refer to the above-mention embodiments of the backlight module.

As described above, in the backlight module and the liquid crystal display apparatus of the present invention, with the use of the reflective element having the reflective curved surface and the first reflective plane, the coupling efficiency of the backlight module can be improved, thereby solving the problem of low coupling efficiency existing in the conventional backlight module and the liquid crystal display apparatus.

The present invention has been described with a preferred embodiment thereof and it is understood that many changes and modifications to the described embodiment can be carried out without departing from the scope and the spirit of the invention that is intended to be limited only by the appended claims.

The invention claimed is:
1. A backlight module, comprising:
a light guide plate;
a base disposed at one side of the light guide plate;
a light source disposed on the base; and
a reflective element configured to reflect light rays which are emitted from the light source to a light-incident surface of the light guide plate, wherein the reflective element includes a reflective curved surface and a first reflective plane connected thereto, and the first reflective plane is parallel to the light-incident surface of the light guide plate, and the reflective curved surface has a profile curve of a gradually reducing slope, and the reflective curved surface has a first curvature radius and a second curvature radius, and the first curvature radius is close to the light guide plate, and the second curvature radius is far away the light guide plate, and the second curvature radius is greater than the first curvature radius;

wherein a ratio of a height of the first reflective plane and a height of the reflective curved surface is in the range of 0.9 to 1.1.

2. A backlight module, comprising:
   a light guide plate;
   a base disposed at one side of the light guide plate;
   a light source disposed on the base; and
   a reflective element configured to reflect light rays which are emitted from the light source to a light-incident surface of the light guide plate, wherein the reflective element includes a reflective curved surface and a first reflective plane connected thereto;
wherein a ratio of a height of the first reflective plane and height of the reflective curved surface is in the range of 0.9 to 1.1.

3. The backlight module according to claim 2, wherein the first reflective plane is parallel to the light-incident surface of the light guide plate, and the reflective curved surface has a profile curve of a gradually reducing slope.

4. The backlight module according to claim 2, wherein the reflective element comprises the first reflective plane, a reflective curved surface and a second reflective plane connected in sequence.

5. The backlight module according to claim 2, wherein the reflective curved surface has a first curvature radius and a second curvature radius, and the first curvature radius is close to the light guide plate, and the second curvature radius is far away the light guide plate, and the second curvature radius is greater than the first curvature radius.

6. The backlight module according to claim 4, wherein an angle between the first reflective plane and the second reflective plane is greater than 90 degrees.

7. The backlight module according to claim 3, wherein a change rate of the profile curve is less than 0.7.

8. The backlight module according to claim 3, wherein a maximum slope of the profile curve is in the range of 2 to 2.5, and a minimum slope of the profile curve is in the range of 0.25 to 0.3.

9. The backlight module according to claim 4, wherein another ratio of the height of the reflective curved surface and a height of the second reflective plane is in the range of 9 to 11.

10. A liquid crystal display apparatus, comprising:
    a display panel; and
    a backlight module comprising:
      a light guide plate;
      a base disposed at one side of the light guide plate;
      a light source disposed on the base; and
      a reflective element configured to reflect light rays which are emitted from the light source to a light-incident surface of the light guide plate, wherein the reflective element includes a reflective curved surface and a first reflective plane connected thereto;
    wherein a ratio of a height of the first reflective plane and a height of the reflective curved surface is in the range of 0.9 to 1.1.

11. The liquid crystal display apparatus according to claim 10, wherein the first reflective plane is parallel to the light-incident surface of the light guide plate, and the reflective curved surface has a profile curve of a gradually reducing slope.

12. The liquid crystal display apparatus according to claim 10, wherein the reflective element comprises the first reflective plane, a reflective curved surface and a second reflective plane connected in sequence.

13. The liquid crystal display apparatus according to claim 10, wherein the reflective curved surface has a first curvature radius and a second curvature radius, and the first curvature radius is close to the light guide plate, and the second curvature radius is far away the light guide plate, and the second curvature radius is greater than the first curvature radius.

14. The liquid crystal display apparatus according to claim 13, wherein an angle between the first reflective plane and the second reflective plane is greater than 90 degrees.

15. The liquid crystal display apparatus according to claim 11, wherein a change rate of the profile curve is less than 0.7.

16. The liquid crystal display apparatus according to claim 11, wherein a maximum slope of the profile curve is in the range of 2 to 2.5, and a minimum slope of the profile curve is in the range of 0.25 to 0.3.

17. The liquid crystal display apparatus according to claim 13, wherein another ratio of the height of the reflective curved surface and a height of the second reflective plane is in the range of 9 to 11.

* * * * *